INVENTOR.
R. J. WISE
D. M. ZABRISKIE
BY
ATTORNEY

Feb. 3, 1959
R. J. WISE ET AL
2,872,275
FACSIMILE APPARATUS FOR USE IN PRODUCING
TICKETS, MESSAGES AND THE LIKE
Filed Nov. 23, 1954
10 Sheets-Sheet 3
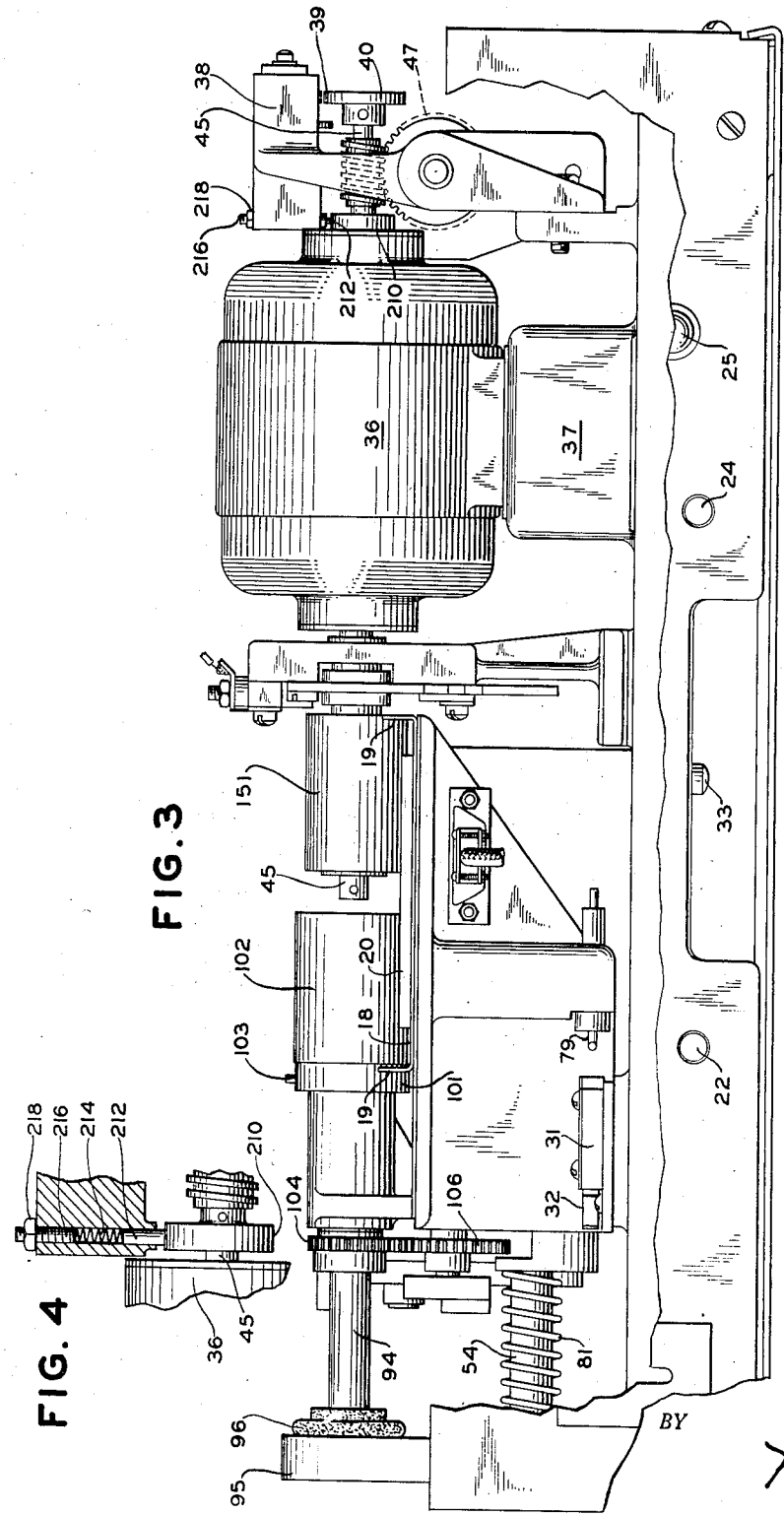
INVENTOR.
R. J. WISE
D. M. ZABRISKIE
BY
ATTORNEY

INVENTOR.
R. J. WISE
D. M. ZABRISKIE
BY
ATTORNEY

INVENTOR.
R. J. WISE
D. M. ZABRISKIE
ATTORNEY

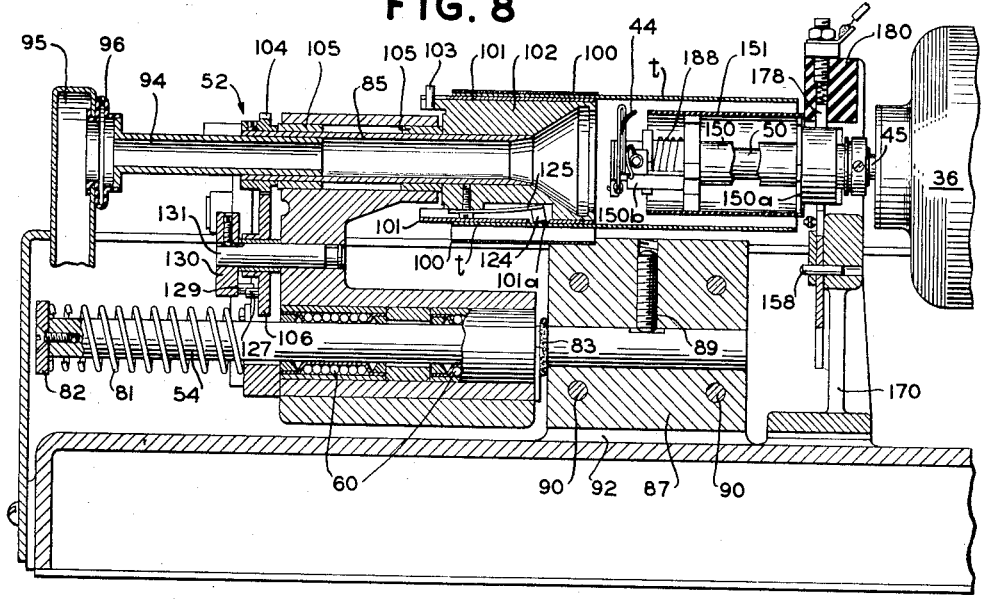
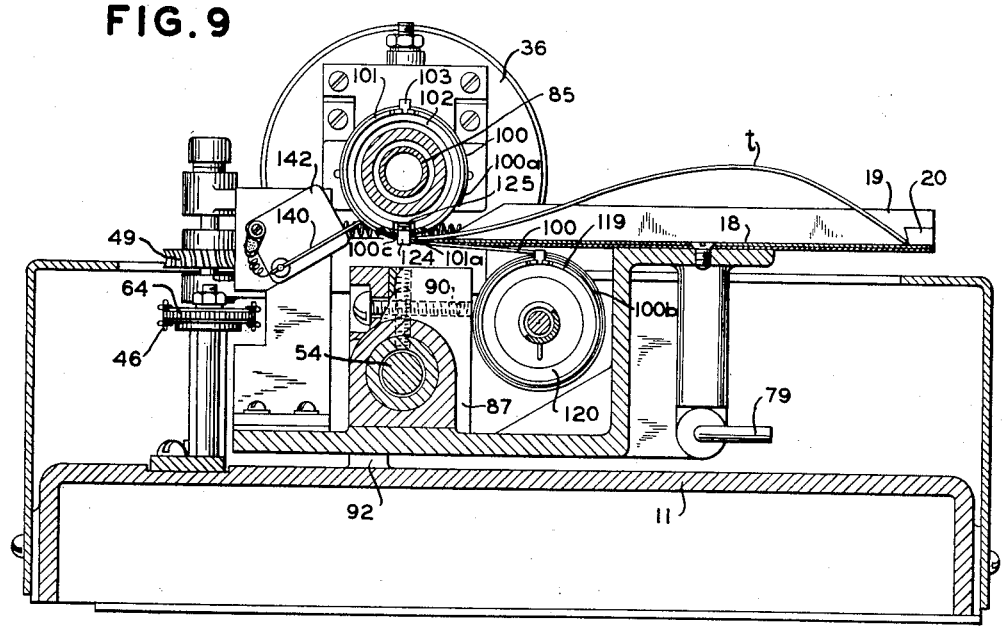

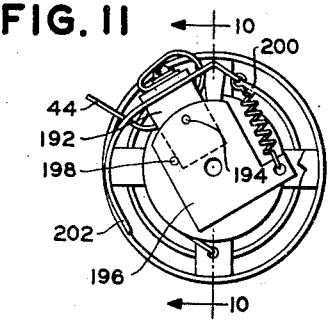
FIG. 11
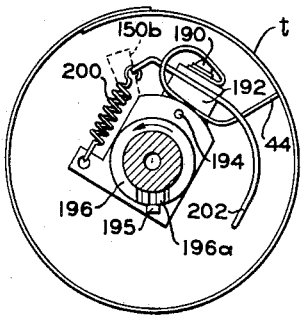
FIG. 12
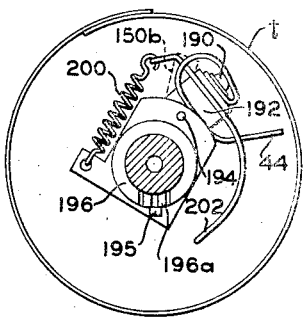
FIG. 13
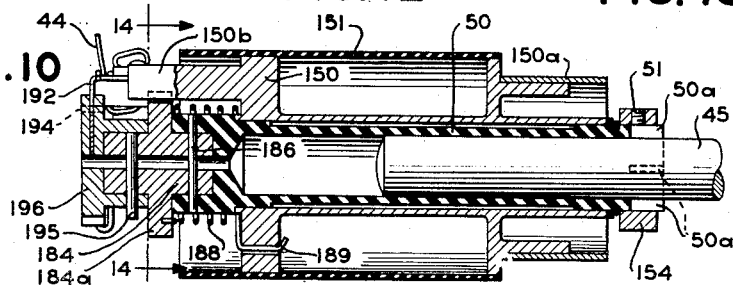
FIG. 10
FIG. 20
FIG. 21
FIG. 22
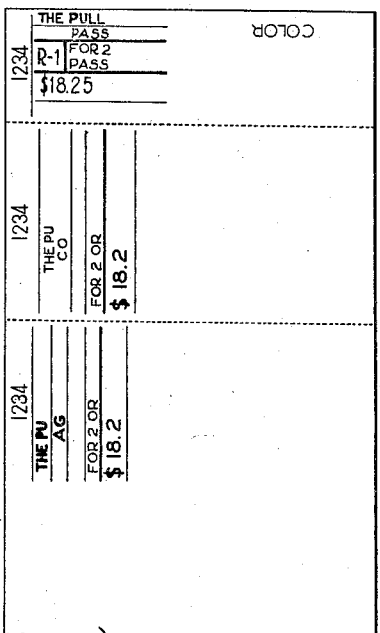
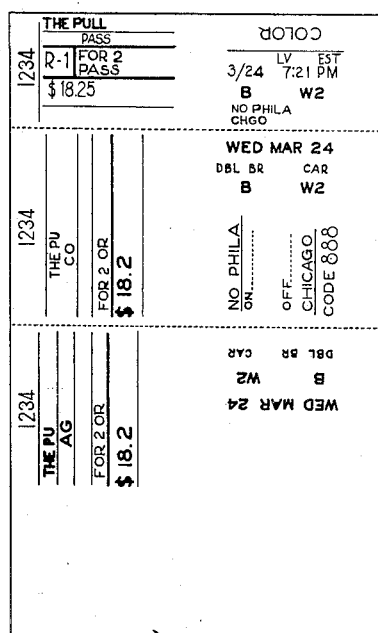
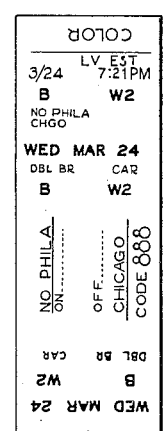
INVENTOR.
R. J. WISE
D. M. ZABRISKIE
BY
*J. F. Presson*
ATTORNEY

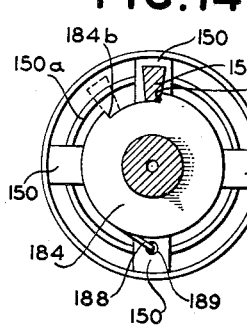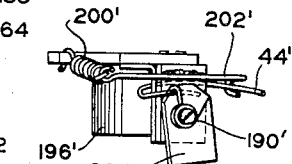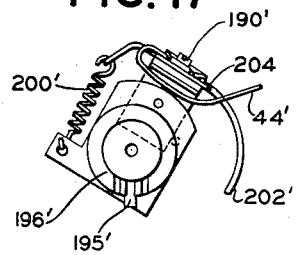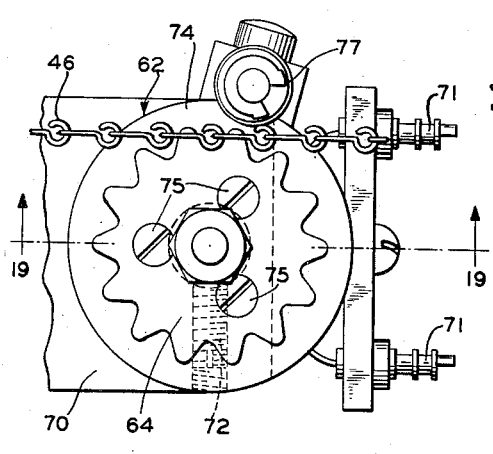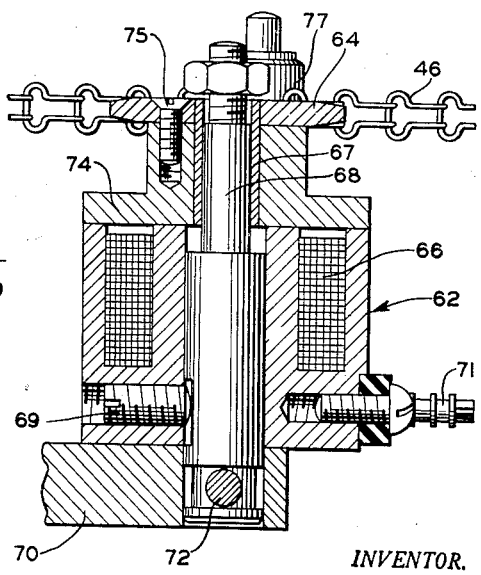

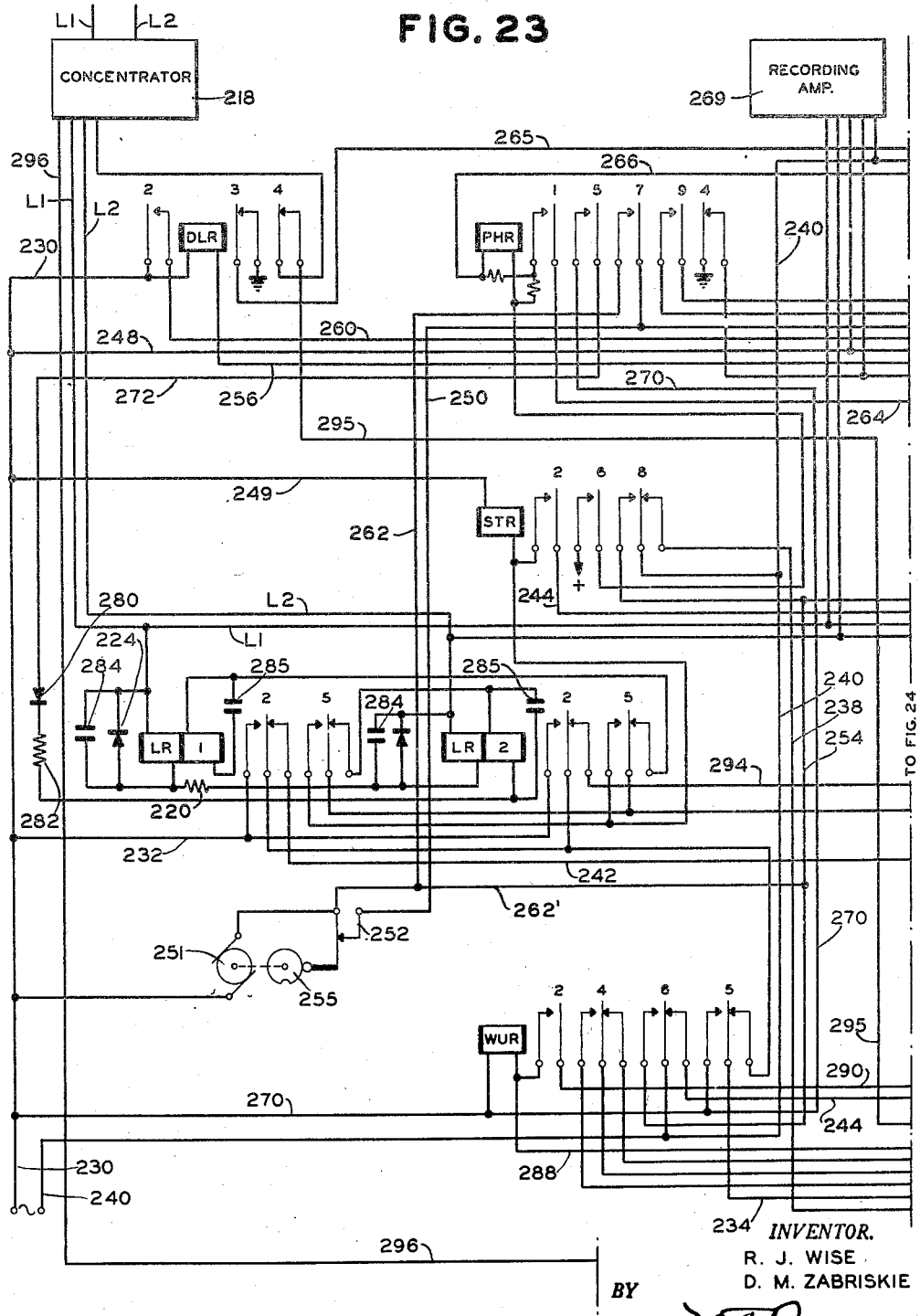

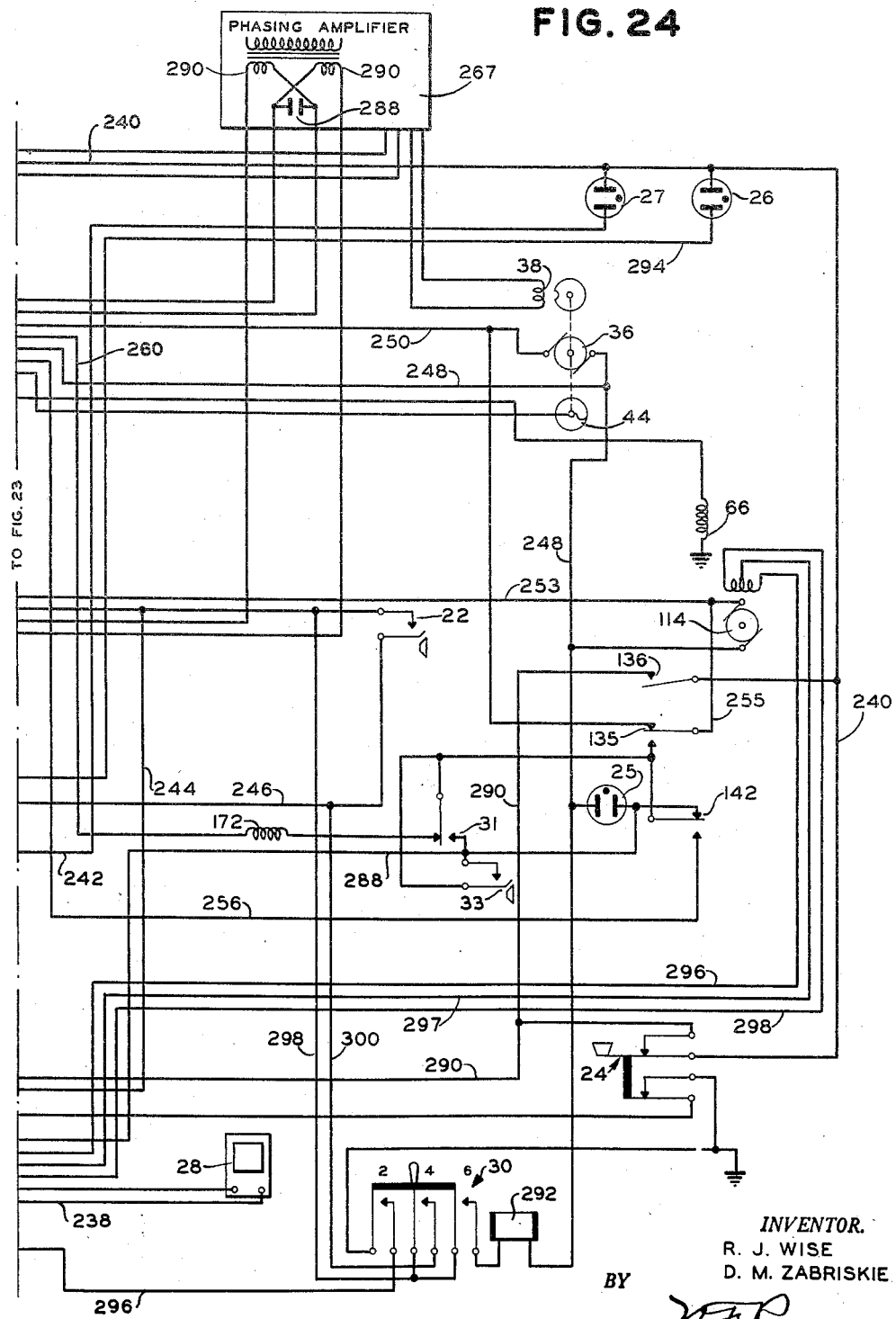

United States Patent Office 2,872,275
Patented Feb. 3, 1959

2,872,275

FACSIMILE APPARATUS FOR USE IN PRODUCING TICKETS, MESSAGES AND THE LIKE

Raleigh J. Wise, Arlington, and Douglas M. Zabriskie, Northvale, N. J., assignors to The Western Union Telegraph Company, New York, N. Y., a corporation of New York Application November 23, 1954, Serial No. 470,628

14 Claims. (Cl. 346—74)

This invention relates to facsimile apparatus, and particularly to such apparatus adapted to receive messages on electrosensitive recording blanks, and also to validate and issue tickets, coupons or the like, having certain preprinted matter thereon, at a branch ticket office or at a patron's office in response to facsimile signals transmitted from a control center where original or master tickets or coupons are prepared and retained for reservation, accounting or other purpose. While particularly adapted for facsimile recording apparatus, the invention also involves features which are applicable to facsimile transmitting apparatus.

While not limited thereto the invention is especially applicable to the reservation and sale of railroad or Pullman space by a number of agents at different ticket offices. At present it is customary to allocate groups or blocks of tickets for such space to the different ticket offices, with the result that frequently it is not known up to the time of departure of a train whether all of the space has been sold or not, this condition being aggravated by cancellations made on the day of departure. Consequently many trains leave with unsold space which could have been sold if a central control office, or ticket center, had this information at a reasonable time prior to the departure time. Surveys made by one of the large railroads have shown that the revenue losses due to unsold space which could have been sold on its first-class trains if the exact reservation status had been known prior to the departure times, exceed a million dollars per year. Similar conditions apply to the sale of tickets for theatres, sporting events and the like.

An object of the instant invention is to provide facsimile recording apparatus whereby an agent or other authorized person may insert an electrosensitive recording sheet comprising a ticket form or coupon having on one portion thereof certain preprinted identifying information, which ticket form is automatically wrapped into a cylindrical tube in such manner that another portion thereof may be scanned by a recording stylus, the apparatus being responsive to facsimile signals transmitted from a central ticket office or other control station for printing indicia or other subject-matter on said another portion of the ticket form or coupon for validating the same for sale to a passenger, patron or other customer.

Other objects are to provide various novel and improved features in facsimile apparatus including means for automatically wrapping a sheet into a cylindrical tube with the leading and trailing ends of the sheet overlapping and suitable for internal scanning either for transmitting or recording purposes; for urging the leading end of a sheet into a position to be gripped by the cylindrical-forming means; for automatically unwrapping and ejecting a sheet after a scanning operation is completed; for phasing the sheet properly with respect to the scanning mechanism prior to a scanning operation; for holding the cylindrical tube comprising the wrapped sheet in such manner that a substantial length of the formed tube longitudinally extends beyond the wrapper mechanism to facilitate scanning the inner surface of the extending length of the tube; for automatically actuating an electrical recording stylus into contact with the inner surface of the cylindrical tube for effecting a recording operation and for automatically retracting the stylus at the completion of the recording operation; for controlling through an electromagnetic clutch the movements of a scanning carriage for effecting line feed during a scanning operation; and for minimizing vibration of a flexible stylus during recording operations.

In accordance with one use of the instant invention, a facsimile recorder is provided at each satellite station or branch ticket office, for example, a railroad ticket office. Should a customer desire Pullman space on a certain train for a particular date, the agent or ticket salesman at the branch office will send a request, as by means of a written Pullman space request form transmitted by a facsimile transmitter, to the ticket center. The agent, knowing the price of the requested space, will be prepared to place the correctly priced ticket form on the loading platform of his recorder to receive a facsimile of the proper space coupon from the ticket center. The ticket form preferably comprises a dry electrosensitive recording blank, for example, one of the types disclosed in U. S. Patents Nos. 2,251,742, 2,294,146, 2,528,005 and 2,681,309. Such a ticket form, which is approximately 4″ x 5½″ in size, has certain preprinted data on a portion of the face thereof, including the net price of the ticket, the amount of the tax, and the total price paid. The ticket form is perforated along lines so that it is separable into three slips, the first of which is a stub to be retained by the selling agent, the second being a slip that is taken up and retained by the Pullman conductor on the train, and the third being a check that is detached by the conductor and returned to the passenger.

A call from the ticket center signifying that it is ready to send signals representing the requested space is indicated on the recorder by the sounding of a buzzer and the glowing of a "coupon" lamp. The agent, who previously had placed the correct ticket form on the loading platform of the recorder, presses a start button which causes the ticket form to be drawn into the recorder and rolled into a cylindrical tube such that a portion of the inner surface of the rolled ticket form may be scanned and marked, by a rotating electrical stylus within the tube, in accordance with the incoming facsimile signals from the coupon at the ticket center. The recorder is caused to phase with the distant ticket center transmitter, transmission of the signals is started, and the ticket is validated by the indicia printed thereon by the recording stylus. When the reception is completed, the "coupon" lamp ceases to glow, the buzzer again sounds, an "end-of-message" lamp glows and the validated ticket is ejected onto the loading platform. In response to the "end-of-message" signal, the agent removes the ticket from the recorder and presses an "end-of-message" button which silences the buzzer and extinguishes the "end-of-message" lamp.

In the above transaction if the space requested had not been available, the return call from the ticket center would have been indicated by the buzzer and the glowing of a "message" lamp. In that event the agent would have placed a plain electrosensitive recording blank on the machine and the reception of a facsimile message to such effect would have been received in the same manner as above described for the validation of the ticket or "coupon." Such a message may also give information as to other space available on the specified train or the availability of the requested space on a different train.

The foregoing and other features and advantages of the invention will be apparent from the following detailed description of an illustrative embodiment thereof, taken in connection with the accompanying drawings, in which:

Fig. 3 is a front view of the recorder, with a portion of the frame broken away;

Fig. 4 is a fragmentary detail view of certain elements for preventing reverse rotation of the stylus drive motor;

Fig. 8 is a sectional view taken along the line 8—8 of Fig. 2, the figure showing a ticket blank that has been wrapped by the wrapper mechanism in the form of a cylindrical tube for a recording operation;

Fig. 9 is a sectional view taken along the line 9—9 of Fig. 2, but showing the wrapper mechanism in readiness to receive a ticket blank to be wrapped;

Fig. 10 is a longitudinal sectional view of the recording stylus mechanism;

Fig. 11 is a left hand end view of the recording stylus mechanism of Fig. 10;

Fig. 12 shows the other side of the stylus mechanism with the stylus in contact with a rolled ticket blank for a recording operation;

Fig. 13 shows the stylus in retracted position;

Fig. 14 is a sectional view taken along the line 14—14 of Fig. 10;

Fig. 15 shows details of a brake mechanism employed in connection with controlling the position of the stylus;

Fig. 16 is a top view of a modified form of stylus adjusting device;

Fig. 17 is an end view of the device of Fig. 16;

Fig. 18 is a fragmentary detailed view of carriage clutch mechanism employed;

Fig. 19 is a sectional view taken along the line 19—19 of Fig. 18;

Fig. 20 shows an electrosensitive recording ticket form for use as a Pullman ticket, having certain preprinted information on one portion thereof and having a blank portion for receiving incoming facsimile signals applied thereto by a recording stylus to validate the ticket;

Fig. 21 shows the ticket form of Fig. 20 after it has been printed and thereby validated by the recorder;

Fig. 22 shows a ticket or coupon from which facsimile signals were transmitted to effect printing and issuing of the ticket of Fig. 21; and Figs. 23 and 24 together show a wiring diagram for operating the various components of the recorder.

Figure 1:
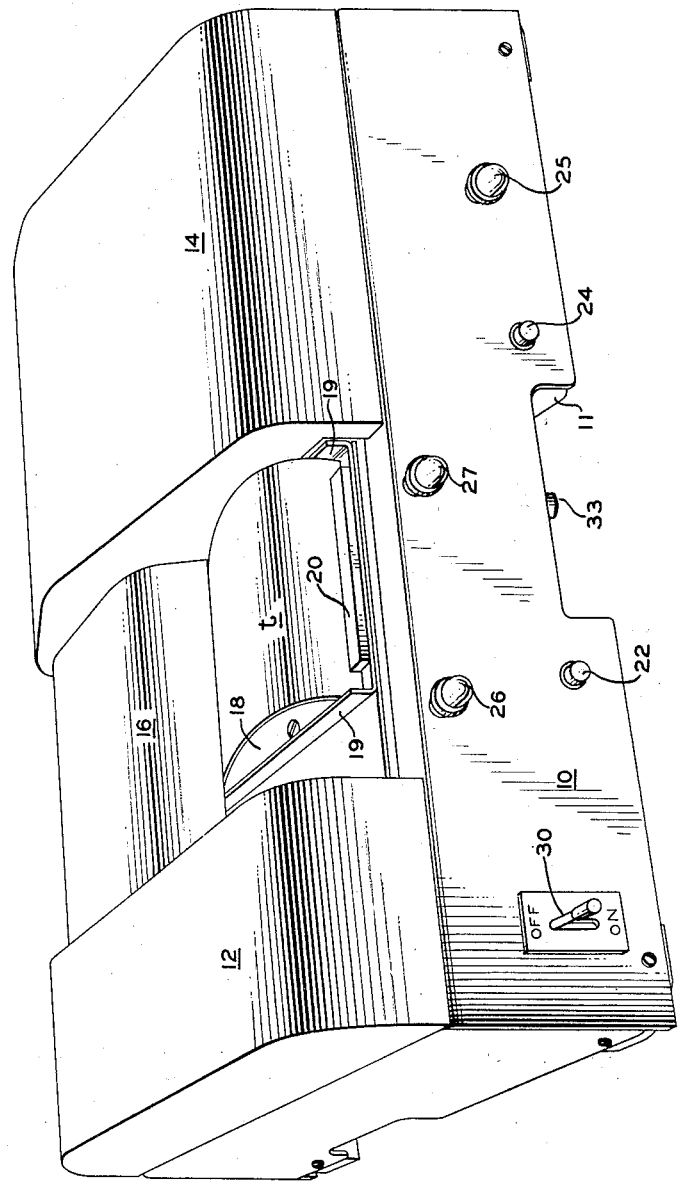
Fig. 1 is a perspective view of a facsimile recorder for printing tickets at an agent's office or a patron's office, under control of facsimile signals, received from a central office.

Fig. 1 shows a recorder in which the apparatus is mounted on a base or frame 11 surrounded by a housing generally indicated at 10 and protected by removable cover plates 12, 14 and 16. A loading platform or bed 18 has upturned guide edges 19, 19, which are spaced to receive a ticket form t for a recording operation, and having a front rail 20 against which the trailing end of the ticket form abuts to cause the same to bow up slightly thereby to assure that its leading end will be gripped by cylinder-forming structure hereinafter described. As above stated, the ticket form preferably comprises a dry electrosensitive recording paper with certain data preprinted thereon. The front panel of the housing contains a push button 22 which operates as a start button for the recorder, and an end-of-message push button 24 which when actuated by the clerk puts out a light 25 and stops a buzzer 28 and places the recorder in a standby condition. The light 25, when lit, provides and end-of-message signal to indicate when the ticket form has been recorded in a manner to validate it. Another signal "coupon" light 26 mounted on the panel, when energized, informs the receiving operator or agent that the central control station is ready to issue a ticket or coupon. A signal light 27 is provided to notify the receiving operator that the control center desires to send a message instead of issuing a ticket. A relay type of switch is also mounted on the panel and is actuated by an arm 30 which when manually depressed by the agent, places the recorder in condition to respond automatically to incoming signals from the transmitter, and operates as an automatic answering device in that when the relay is operated, an inserted blank or ticket may be printed while the agent is attending to other duties. A "release" push button 33 is mounted under the central portion of the frame 11 and when operated will cause the ticket from t to be unwrapped and ejected in the event that a mistake is discovered before scanning has commenced, for example, if the agent notices that he has inserted the wrong kind of ticket form.

Figure 2:
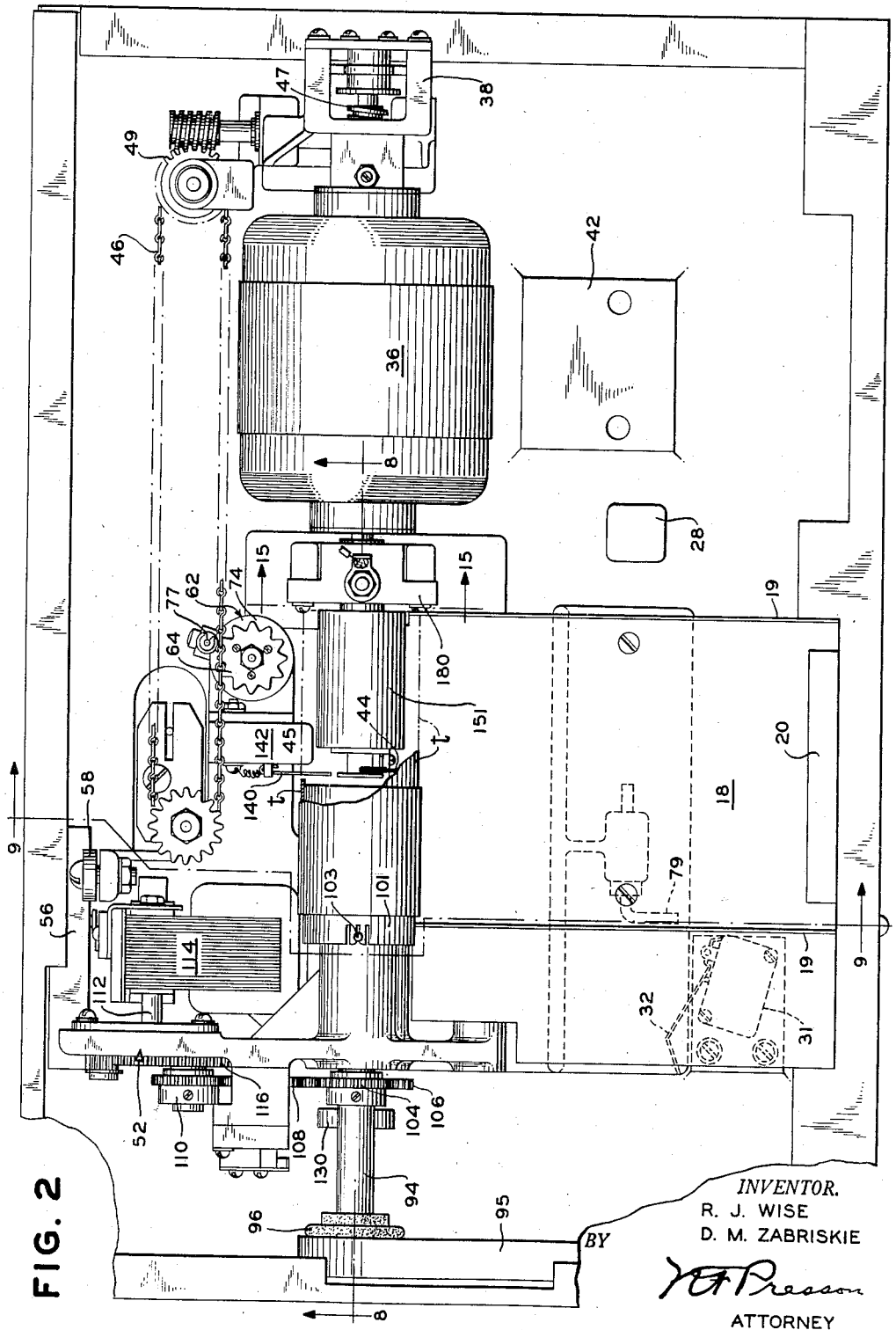
Fig. 2 is a top plan view of the recorder of Fig. 1, with the cover plates removed.

The calling buzzer 28, seen in Fig. 2, is caused to operate simultaneously with any of the three signal lamps 25, 26 and 27, but only when the automatic answer switch 30 is in its "off" position as seen in Fig. 1; when the switch is thrown downwardly to its "on" position the buzzer will sound only when the end-of-message signal light 25 is energized. Referring to Figs. 2 and 3 of the drawings, an end-of-message switch 31 (shown in dotted outline in Fig. 2) has a switch arm 32 that is mechanically operated by an actuator arm 79 mounted on the recording stylus carriage, generally indicated at 52, at the end of a recording operation.

Fig. 20 shows a Pullman ticket form t on which certain preprinted data appears on the left hand portion of the form, such as an identifying serial number and the price for a given class of accommodations represented by the ticket form. The remainder of the form is blank for receiving signals comprising a facsimile of a coupon to be transmitted by the ticket center in order to validate and issue the desired ticket. Ticket forms with different data preprinted thereon are provided for different classes of accommodations and for different prices applicable thereto, and to enable the agent to distinguish more readily between the different forms, small areas on the forms (indicated by the word "Color") may be printed with different colored inks respectively representing the different classes. The ticket form is perforated as indicated by the two dotted lines appearing thereon.

Fig. 21 shows a ticket form that has been validated at the agent's station by electrically recording on the right hand portion of the form a facsimile of a coupon filled in with the proper data at the ticket center and then scanned by a facsimile transmitter and the signals transmitted to the recorder. Fig. 22 shows the coupon as prepared at the ticket center; after transmission the coupon is retained for checking, accounting and other purposes.

Figure 6:
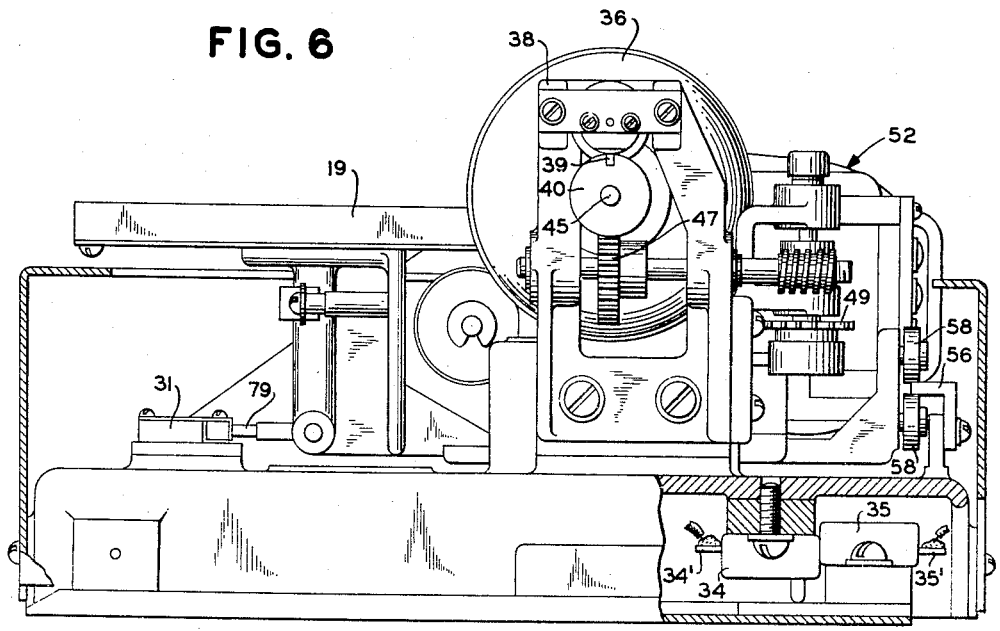
Fig. 6 is a right hand end view of the machine, as seen in Fig. 3.

The internal electric circuits of the recorder are soldered to terminals 34' of attachment plugs 34 (seen in Fig. 6) which have prongs that are insertable in socket members 35 having terminals 35' to which the proper external connections are soldered. The plug and socket members facilitate ready connection or disconnection of the internal circuits. A synchronous motor 36, Figs. 2 and 3, which is mounted on a base or mounting pad 37, drives the recording scanning carriage and its stylus mechanism, and also operates a phasing pulse generator which comprises a magnetic pickup coil 38 wound on a core and having an air gap traversed by a small permanent magnet 39 which is mounted in a rotatable disc 40 of non-magnetic material, for example, brass or a phenolic condensation product, or the like. In Fig. 2 is shown a mounting pad 42 upon which the motor 36 may be mounted instead of being mounted on the base 37, if the motor is to be geared down to reduce the scanning speed of the apparatus, in which case the recording stylus shaft 45 is driven by reducing gears (not shown) coupled to the motor 36. The stylus shaft preferably is an extension of the motor shaft when the motor is mounted in the manner shown in Fig. 2.

*Line feed scanning carriage.*—The recording stylus 44, Figs. 2 and 10, is carried by an assembly that is mounted on and rotated by an insulating sleeve 50 which is mounted on and rotated by the shaft 45. A drive belt, such as a chain 46, Fig. 2, is driven at a predetermined constant speed by the motor 36, through two pairs of reduction gears 47 and 49, for driving the scanning carriage 52, Figs. 2 and 7, in one direction for effecting line feed. The carriage is supported by a shaft 54 and a rail 56, Figs. 7 and 8, and the carriage travels on the shaft and rail by means of roller bearings 58 and a pair of ball bushings 60. Motion is imparted to the carriage by a magnetic clutch 62, seen in Figs. 2, 18 and 19. The clutch is normally deenergized so that a sprocket 64 idles, but when the magnet is energized in response to a start signal received over the line from the transmitter at the control center, the sprocket is prevented from idling and thus causes the stylus carriage to be moved along by the chain 46 for effecting line feed during a recording operation. The clutch comprises a magnet winding 66, embedded in a casing 62 of magnetic material, and having solder terminals 71. A stud 68 held by a set screw 69 to the magnetic structure, is supported in a carriage frame 70 by a set screw 72. An armature 74 and its bushing 67 are rotatably mounted on the reduced end of the shaft 68, and the armature carries with it the sprocket 64 which is secured thereto in any suitable manner, as by screws 75. When the coil 66 is energized, the casing 62 and armature 74 are magnetically locked together and the entire unit is caused to move by chain belt 46 in a direction to effect a line feeding operation of the stylus carriage. An idler roller 77 prevents the chain 46 from becoming disengaged from the sprocket 64.

Referring again to Figs. 2 and 3, after the scanning carriage has traveled longitudinally to the extent required to scan the width of the blank recording area on a ticket form, the switch actuator 79 operates the arm 32 of the end-of-message switch 31 which, through circuit connections, deenergizes the clutch magnet winding 66 of the clutch 62, and permits the sprocket 64 to idle backwards, and the carriage to be retracted to its initial starting position by a compression spring 81, Fig. 8, acting against a collar 82 secured, as by a screw, to the end of the shaft 54. A rubber bumper 83 reduces shock when the carriage is returned to its starting position.

It is highly important that the axis of the motor and stylus shaft 45 be maintained in exact alignment with the axis of a hollow shaft 85 of the wrapper mechanism shown in detail in Figs. 8 and 9, in order to prevent poor copy occasioned by eccentricity or lack of constant stylus pressure throughout its circular scanning movement. For this reason the position of the motor is adjustable both longitudinally and laterally by means of its mounting screws, and the carriage guide shaft 54 is held in a block 87 by a screw 89, vertical adjustment of the block being provided by screws 90 received within openings in the web 92 of the base 11, which openings have sufficient clearance to permit limited adjustment of the block, the screws being received in threaded holes in the block 87.

The tube or hollow shaft 85 is longitudinally slidable, during a scanning operation, over a hollow vent tube 94 that communicates with a conduit 95 by means of a rubber coupling 96. The vent system is exhausted by an exhaust fan (not shown) in order to remove any fumes arising from the action of the stylus 44 during a recording operation, the stylus assembly hereinafter described being constructed to enable air flow through the assembly to facilitate the venting operation.

Figure 5:
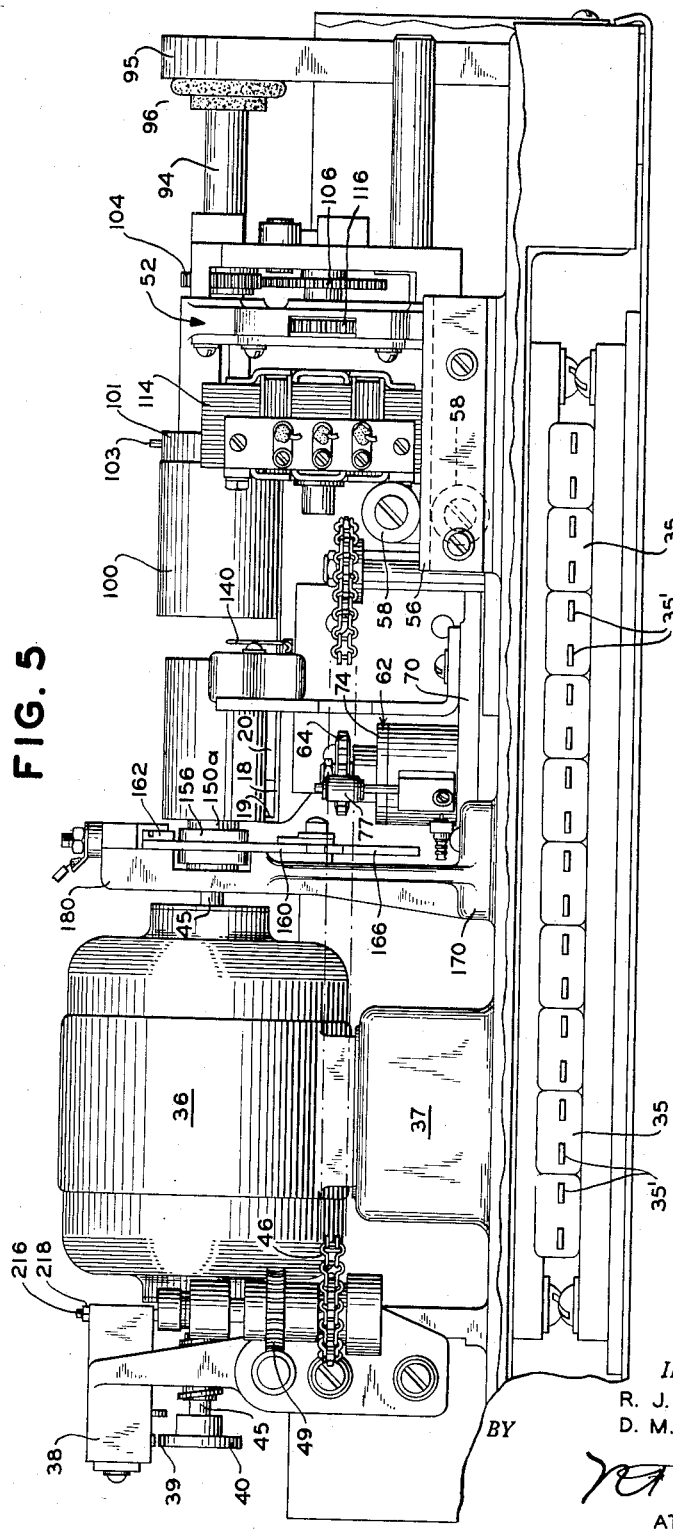
Fig. 5 is a rear view of the recorder.
Figure 7:
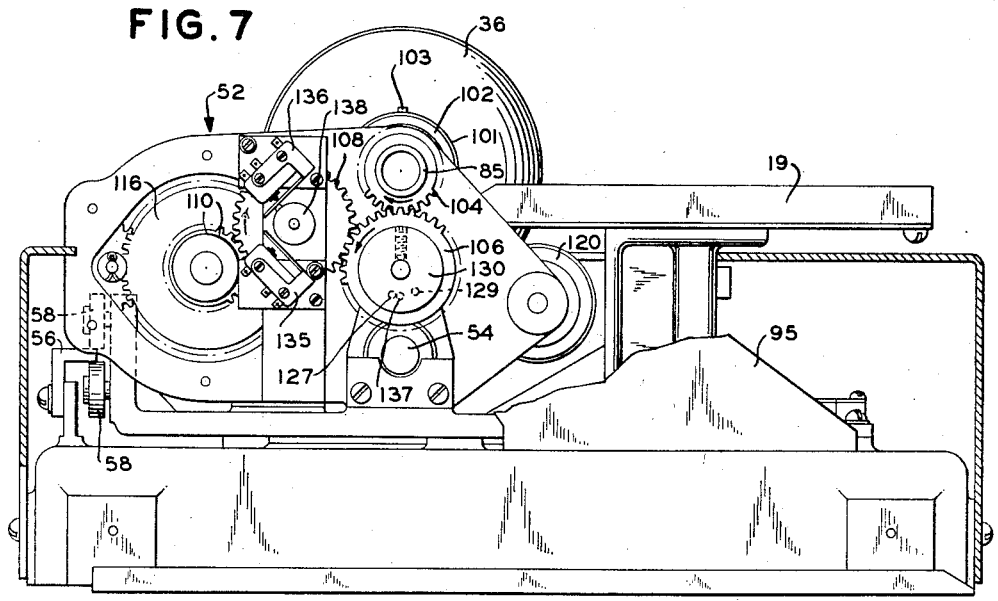
Fig. 7 is a left hand end view of the machine.

*Wrapper mechanism.*—The wrapper mechanism, Figs. 7 to 9, comprises a flexible wrapper web 100, Figs. 8 and 9, which has the leading end thereof fastened, as by cement, to a cylindrical former comprising a sleeve 101 which surrounds a wrapper drum 102 and is releasably secured thereto by a pin 103 mounted in the drum 102. The drum is rotatably mounted in bearings 105, and is rotated by gears 104, 106 and 108, Figs. 2, 7 and 8, driven by a gear 110. The gear 110 is driven, through an internal gear train including a gear 116, by a shaft 112 of a reversible motor 114, Fig. 2. The motor is of a type which may be stalled in either direction without injury thereto. A gear 116, Figs. 5 and 7, is embodied in an internal motor gear train associated with the motor armature. The other end of the wrapper web 100 is secured at 100b, as by cementing, to a rotatable retractile drum 120. The web is wound around the retractile drum 120 which is biased by a spring that tends to rotate the drum in a clockwise direction, and also acts to keep the wrapper web taut at all times.

With the sheet comprising the ticket form *t* shown in the position seen in Fig. 9, the leading end of the sheet pushes against a pin 124 that passes through a hole 101*a* (seen for clearly in Fig. 8) in the sleeve 101 and a hole 100*c*, Fig. 9, in wrapper 100. The pin is carried by a flexible tongue 125, the fixed end of which is secured to the end of the drum 102 by a screw as seen in Fig. 8. Since the ticket form to be scanned is inserted with its leading end abutting the pin 124, this insures proper phase relationship with the recording stylus. The trailing end of the sheet, as hereinbefore stated, abuts against a block 20, and the slight spring effect of the bowed sheet insures that the leading end thereof will follow the pin 124 until the leading end is gripped between the sleeve 101 and the wrapper 100. The drum 102 and the sleeve 101 are rotated by the motor 114 and gears 104—110 in a clockwise direction, as viewed in Fig. 9, either in response to manual operation of the start button 22 or by automatic operation when the switch 30 is in its "on" position.

Continued rotation of the drum 102 through a predetermined angle wraps the ticket form when in the web 100 until the ticket form is rolled into a cylindrical tube, at which time further rotation of drum 102 is prevented by the engagement of a pin 127, Fig. 8, in the idler gear 106 with a pin 129 in a fixed collar 130.

The collar is mounted on a stub shaft 131 which, in turn, is rigidly secured to the scanning carriage frame, thereby stalling the motor 114 during the entire period of the scanning operation. When scanning is completed, the motor 114 is reversed by a reversing signal from the local control circuit, which permits the pin 127 to end its engagement with pin 129. The sleeve 101 rotates in a reverse direction to unwrap the wrapper web 100 until pin 127 is stopped by engagement with a pin 137, Fig. 7, also fastened to the collar 130, causing the motor 114 again to stall. The validated ticket form is ejected by the unwrapping action of the wrapper 100 and the wrapper mechanism including the pin 124 is again in standby position for the insertion of a subsequent ticket form or blank.

In order that the transmitting central will be informed of the condition at the recorder, two microswitches 135 and 136, Fig. 7, are provided, these switches being controlled by a cam 138 which is rotatable with the gear 108. The "unwrap" switch 136 is operated by the cam to open-circuit position when the wrapper mechanism is in standby condition for receiving a ticket form or a blank, and the "wrap" transfer switch 135 is operated by the cam upon the completion of a wrapping operation.

The wrapper drum of the recorder rotates through an angle greater than 360°, for example, 390°, in order to form a more rigid tube from the ticket form or blank, and in doing this the sheet when passing the pin 124 during a wrapping operation causes the pin to be pushed flush into the sleeve 101 and hence the pin does not affect the cylindrical form. Each time that a ticket form or a blank is wrapped, the leading edge of the sheet engages a pivot arm 140, Figs. 2 and 9, of a transfer "paper-in" switch 142 to operate the same and close a circuit to indicate the presence of the ticket form or blank. If the recorder should be started without a ticket form or a blank having been inserted, the transfer switch 142 remains unoperated and an indication to this effect is given by the end-of-message lamp and the buzzer 28. In this case, when the switch 135 is operated by the cam 138, the local control circuit causes the motor 113 to reverse and this causes the recorder to return to the standby position.

*Stylus mechanism.*—The stylus assembly, shown in detail in Figs. 10 to 13, comprises a stylus holder drum 150, Fig. 10, mounted on the sleeve 50, the drum being electrically insulated from the drive shaft 45 by means of the sleeve which is composed of insulating material. The drum 150 is intercoupled with, and is rotated in one direction, by the sleeve 50 through a helical spring 188, the spring also enabling rotation of the drum in a reverse direction through a predetermined angle relative to the sleeve 50 for reasons hereinafter set forth. The sleeve is rotated by the driving shaft 45 and is adjustable around the shaft for phasing purposes. When a proper phasing position on the sleeve initially is obtained, the sleeve is clamped to the shaft 45 by a set screw 51 in a collar 154; tightening the set screw compresses the split end 50a of the sleeve between the collar 154 and the shaft 45. A sleeve 151, preferably of insulating material, encloses the drum 150.

The drum has a portion 150a, Fig. 10, which performs the combined functions of a braking surface and a slip ring. Coacting with the portion 150a are two brake shoes 156, seen in Fig. 15, which are pivotally mounted at 158 so that the shoes are self-centering. Each brake shoe is carried by a lever 160 which at its upper end is pivotally mounted at 162 to a bracket 170. The two levers are drawn together by a coil spring 164 which causes the brake shoes normally to exert a braking action on the surface 150a of the drum 150 and places a sufficient drag thereon to tension a torsional spring 188, Fig. 10, for the purposes explained below. A lever 166, pivotally mounted at 168 on the bracket 170, when actuated by a solenoid 172 operates to spread the levers 160 apart, against the tension of the spring 164, and release the brake shoes 156. The portion 150a also operates as a slip ring with a brush 178, Figs. 8 and 15, to conduct the incoming facsimile signals to the rotating recording stylus. Brush 178 is insulated from the bracket 170 by its mounting 180 held by screws 182.

The insulating sleeve 50, Fig. 10, carries a metallic stylus-mounting hub member 184 secured thereto by a pin 186. The hub has a flanged portion 184a which is notched to form stop lugs or shoulders 184b and 184c, seen in Fig. 14. Surrounding the sleeve 50 is the torsional spring 188, one end of which is anchored at 189 in drum 150, the other end being secured to the flange 184a. The spring 188 exerts a resilient turning force between drum 150 and the hub 184 to cause an arm 150b normally to abut against the shoulder 184c, Fig. 14. The application of the brake shoes 156 and the continued rotation of the shaft 45 and member 50 through a slight angle tensions the spring and also causes relative rotation between the arm 150b and the hub 184 until the shoulder 184b abuts the arm 150b. The relative movement between 150 and 184, due to the selective application and release of the brake shoes, is used (1) to retract the stylus 44 through a predetermined angle and prevent the engagement thereof with the ticket form during the wrapping and tube-forming operation, (2) to then permit the spring 188 to expand and rotate the stylus into contact with the wrapped tube for a recording operation, and (3) to again retract the stylus for the unwrapping and carriage return operations.

The recording stylus 44, Figs. 10 to 13, preferably comprises a fine tungsten wire, approximately 8 mils in diameter, having the fixed end thereof secured in any suitable manner, as by a screw 190 secured to an L-shaped lever 192 which is combed in a slot in a cap 196 and pivotally mounted at 194 to the cap. The cap slides over the hub 184 with a close fit and has a slotted portion that receives a pin 195 that passes through the hub 184 so that the cap is rotated by the hub. The lever 192 is rotatable about the pivot 194 and is biased towards a stop pin 198 by a coil spring 200; when the lever is against the stop pin, the end of the stylus 44 is in contact with the inner surface of the cylindrical ticket form *t* for a recording operation, this position of the stylus being shown in Fig. 12. Fig. 13 shows the stylus in its retracted position due to the movement of the arm 150b hereinbefore referred to, the arm having engaged and rotated the lever 192, against the tension of spring 200, to rotate and retract the stylus.

The desired degree of stylus pressure on the ticket form principally is obtained and determined by the resiliency of the tungsten wire 44. To prevent vibration of the stylus wire, the resilience of the wire is utilized in a transverse direction to cause the wire to bear against a damping member 202 secured to the lever 192. This damping member may, for example, comprise a wire having sufficient rigidity to effect a damping action of the stylus; a steel wire $\frac{1}{32}''$ in diameter is suitable. The degree of damping is controlled by adjustment of the stylus around the screw 190. Figs. 16 and 17 show a modified form which facilitates adjustment of the stylus to control the degree of damping. In this form the stylus wire 44' is welded to a metal tab 204 which is adjustably rotatable and is held in adjusted position by the screw 190'.

The stylus is automatically kept out of contact with the paper tube *t* when the tube is being formed and also during the unwrapping operation, that is, the stylus is in its recording position only when the tube is completely formed, as hereinbefore set forth. More specifically, this is effected by reason of the fact that the stylus is withdrawn by the application of the brake shoes and the further rotation of the drive shaft, which action overcomes the tension of the spring 188, Fig. 10, at this time thus causing the arm 150b, Fig. 14, to engage the stop 184b, and the stylus to rotate about its pivot point through an angle of approximately 20° in a clockwise direction as viewed in Figs. 12 and 13. Upon release of the brake shoes, the spring 188 unwinds and causes the arm 150b to move over to the stop lug 184c and with it the L-shaped lever 192, thus actuating the stylus to its recording position seen in Fig. 12.

The ticket form or blank *t* when wrapped into tubular form for a recording operation has over half its width (or over half the length of the tube) unsupported except by the remainder of the tube held between the web 100 and the former 102, as seen in Fig. 8, but since the edges of the sheet are overlapped the sheet has sufficient stiffness to enable the proper stylus pressure to be employed without distortion or creasing of the sheet, even though a relatively thin ticket blank should be employed. If a heavier sheet should be used for the ticket blank, then the overlapping of the edges of the cylindrical sheet enables the formation of a substantially true cylindrical configuration such that there is substantially no contact bounce of the stylus during a scanning operation.

When the drive motor 36 is deenergized and the stylus is in its retracted position, the tension of the helical spring 188 tends to rotate the motor shaft 45 backwards, and if this were permitted to occur the stylus would again be urged outwardly into recording position and thus subject to damage during the wrapping and unwrapping operations. To prevent this the right hand extending end of the motor shaft 45, as viewed in Fig. 3, has a friction brake collar 210 secured to the shaft. Acting upon the collar is oil-bearing brake member 212 held under constant compression by a helical spring 214, Fig. 4. The pressure exerted on the periphery of the collar by the member 212 is adjustable by a set screw 216 secured in adjusted position by a lock nut 218, and is such that a slight braking action which counteracts the force exerted by the wound spring 188 is obtained without imposing any substantial drag on the motor.

*Diagram of circuit connections.*—Figs. 23 and 24 show a circuit diagram illustrating how various of the elements of the recorder disclosed herein may be operated. The particular circuit arrangement shown in this figure was not devised by the parties hereto, and for this reason details of the circuit are not claimed in the instant case. The recorder is connected by means of an incoming line, represented by conductors L1 and L2, to the distant central control station, these incoming line conductors preferably being connected to concentrator or selector apparatus 218 which enables a number of incoming lines selectively to be switched in proper order to the instant recorder, or enables an incoming line selectively to be connected to any of a number of recorders. Various of the relays in the recorder control circuit are operated by an alternating current source of power represented by conductors 230 and 240. At the distant station a metallic battery is applied as a positive potential on line conductor L2 when it is desired to transmit a message, and on line conductor L1 when it is desired to transmit a ticket or coupon, for printing by the recorder.

Assuming that a message is to be transmitted, the positive voltage on L2 is received over a circuit which includes the left hand (operate) winding of line relay LR2, a 5000 ohm resistor 220, selenium rectifier 224, and line conductor L1 through the concentrator 218 and back to the transmitter at the distant station, energizing line relay LR2. The operation of this relay, at its armature 2 and associated make contact, causes the buzzer 28 to sound, the circuit comprising conductor 240 of the alternating current power supply, armature 8 and break contact of relay STR, conductor 238 to the buzzer 28, conductor 234, armature 5 and break contact of relay WUR, armature 2 and make contact of energized relay LR2, and conductor 232 to the other side 230 of the power source. The armature 2 and make contact of LR2 also causes energization of the "message" lamp 27 since the distant station wishes to send a message instead of a ticket or coupon at this time; this circuit includes armature 2 and break contact of unoperated relay LR1, conductor 242 and message lamp 27 to the other side 240 of the power supply.

In response to the buzzer and message signal light, the agent or other operator at the recorder station places a blank sheet of electrosensitive recording paper on the loading platform of the recorder, and operates the start button 22. This establishes a circuit for the operation of a start relay STR, which circuit may be traced from one side 240 of the power supply, armature 6 and break contact of relay WUR, conductor 244, start button 22, conductor 246, armature 5 and make contact of operated relay LR2, winding of relay STR and conductor 249 to the other side 230 of the power supply. Relay STR operates and is locked up through its armature 2 and make contact, the locking circuit including conductor 244, and break contact and armature 6 of relay WUR. The stylus motor 36 is energized over a circuit including conductor 248, through the motor, conductor 250, contacts 252 of a commutator 255, conductor 262', conductor 254, make contact and armature 8 of operated relay STR, to conductor 240. The wrapper motor 114 also is energized, in a direction to effect a wrapping operation, over a circuit which comprises conductor 248, through the motor, conductor 253, armature 8 and make contact of operated relay STR, to conductor 240. The direction of rotation of the reversible motor 114 is determined by which two conductors of the group 296, 297 and 298 are connected together by armature 4 of relay WUR; with the relay deenergized the conductors 296 and 297 are connected together and the motor rotates in a direction to wrap.

In the complete unwrapped position of the apparatus, the tongue of the unwrap switch 136 is in the open position, as shown. At the completion of a wrapping operation, the tongue of the wrap switch 135 is operated from its upper contact to its lower contact. At idle times or during a recording operation, the foregoing operative positions of these switches respectively are retained. As the recording blank is wrapped the paper-in switch 142 operates so that when the blank is wrapped completely and the wrap switch 135 is operated, relay DLR is energized over a circuit which includes the winding of the relay, conductor 256, lower contact and blade of the operated paper-in switch 142, lower contact and blade of operated wrap switch 135, conductor 255, conductor 253, make contact and armature 8 of relay STR to conductor 240. Armature 2 and make contact of energized relay DLR energizes the stylus brake magnet 172 and releases the stylus to enable it to contact the recording blank for a recording operation. The circuit includes the make contact and armature 2 of DLR, conductor 260, brake winding 172, end-of-message switch 31, wrap switch 135, conductors 255 and 253, and armature 8 and make contact of relay STR to conductor 240.

At its armature 3 the energized relay DLR removes ground from a conductor 265 that extends to a phasing amplifier 267; removal of this ground causes the phasing pulse amplifier to be set up for phasing. There are various methods employed for phasing facsimile transmitters and recorders. In the instant case in which the recorder motor may operate at 1800 R. P. M., electronic phasing is accomplished by the comparison of time positions of pulses generated by both the transmitter and recorder. In both instances the pulses are generated by inducing a voltage across pickup coils, such as the coil 38, by means of an Alnico magnet fixed to the rotating shaft of the 1800 R. P. M. motors such as the stylus motor 36. Thus a pulse is generated once per revolution at a particular orientation of the motor shaft. By establishing, during the line-up procedure, that the positions of the motors at the transmitter and recorder at which pulses are generated are at the correct phase positions, it becomes necessary only to have means to allow both pulses to occur simultaneously and provide a method of automatically locking the system in this state.

In the present case the motors used in the transmitter and recorder are of the 1800 R. P. M. synchronous type and therefore have four possible pole positions in which they may be phased with respect to each other. Only one of these four positions is correct for a given position of the other motor. By allowing the recorder motor 36 to drift one pole position at a time and keeping the transmitter motor running continuously at synchronous speed, a condition is established that permits proper phase orientation of both motors once per revolution of the recorder. When this correct orientation is reached pulses from both motors are generated simultaneously. Drifting of the recorder motor is accomplished by interrupting its power circuit, for a time equal to approximately 35 milliseconds, once every 15 revolutions, by the action of the motor driven commutator 255 which controls contacts 252 of a microswitch, the commutator drive being supplied by a 120 R. P. M. synchronous motor 251.

When the recorder motor is running synchronously at the pole position corresponding to phase, a train of 15 coincident pulses, which appears at the output of a coincidence circuit in the phasing amplifier 267, is applied to an integrator which builds up a direct current voltage proportional to the number of pulses entering it. This direct current voltage is used to actuate a circuit over conductor 266 resulting in energizing a phase relay PHR from positive battery applied by make contact and armature 6 of operated relay STR. Armature 7 and make contact of PHR close across the cam operated microswitch 252, by means of conductors 250 and 262, to prevent further drifting of the recorder motor and thus the system is automatically locked in phase.

Relay PHR is locked through its armature 1 and make contact, and through conductor 264 operates the carriage feed clutch 66, causing scanning by the stylus 44 to take place. Through armature 5 and make contact of relay PHR a circuit is established from one side 230 of the alternating current supply, comprising conductor 270, make contact and armature 5 of PHR, conductor 272, rectifier 280, resistance 282, right hand (locking) winding of line relay LR2, break contact and armature 5 of relay LR1, armature 5 and make contact of operated relay LR2, make contact and armature 2 of operated relay STR, conductor 244, break contact and armature 6 of relay WUR to conductor 240 of the alternating current supply line, thus locking relay LR2 energized. Because of half-wave rectification of this circuit by the rectifier 280, and the fact that relays LR1 and LR2 act as transformers, capacitors 284 are connected across the coils of these relays to remove the 120 cycle ripple. Capacitors 285 are part of the filter circuit of rectifier 280.

Armature 9 and make contact of energized relay PHR short a one microfarad capacitor 288 in the phasing amplifier 267 (which capacitor normally separates the lines L1 and L2 and windings 290 of the transformer coil) thereby shorting lines L1 and L2 across the transformer coil and increasing the normal line current of 15 ma. to approximately 45 ma. This increase in current operates a relay at the distant transmitter which removes the source of metallic battery from lines L1 and L2, and also causes operation of a carriage feed clutch and a relay in the modulator of the transmitter, which starts the scanning operation and removes the phasing pulses and causes the facsimile message signals to be transmitted over the line to the recorder, where they are amplified by the amplifier 269. At its armature 4 and break contact energized relay PHR removes ground from the stylus circuit.

When the incoming message has been scanned by the recorder, the end-of-message switch 31 is operated momentarily by the stylus carriage and this causes relay WUR to be energized over a circuit including conductor 270, winding of the relay, conductor 288, right hand contact and tongue of actuated end-of-message switch 31, wrap switch 135, conductors 255 and 253, make contact and armature 8 of energized relay STR, to conductor 240 of the supply line. Relay WUR operates and locks through its armature 2 and make contact, the locking circuit including conductor 290, end-of-message button 24 and conductor 240. The contacts of the unwrap switch 136 bridge the contacts of the end-of-message button 24 until the completion of the unwrap operation. Relay WUR also opens, at its armature 6, the locking circuit of relay STR which releases. The release of STR releases phasing relay PHR and also the carriage feed clutch 66, allowing the carriage to be returned by a retractile spring to its start position. Armature 4 and make contact of relay WUR connect together conductors 297 and 298, cause the wrap motor 114 to reverse and unwrap the recording blank. The end-of-message lamp 25 is energized from the power supply line 230 over a circuit including conductor 248, through the lamp, conductor 288, make contact and armature 2 of relay WUR, conductor 290, end-of-message button 24, and conductor 240. The buzzer 28 also is sounded over a circuit which includes make contact and armature 5 of relay WUR, conductor 234, through the buzzer, conductor 238, and break contact and armature 8 of deenergized relay STR to conductor 240. Operation of the end-of-message button 24 releases relay WUR, the lamp 25 and the buzzer 28.

For transmission of a ticket or coupon, the functions are the same except that a "coupon" button is depressed at the transmitter. This causes a reversal of line battery which results in the operation of line relay LR1 at the recorder instead of line relay LR2, and this causes the coupon or ticket lamp 26 to light and advise the agent or operator to place a preprinted ticket form on the loading platform of the recorder instead of plain recording paper. The coupon lamp is energized over a circuit which includes power conductor 240, through the lamp 26, conductor 294, break contact and armature 2 of unoperated relay LR2, armature 2 and make contact of operated relay LR1 and conductor 232 to the power supply lead 230.

The automatic answer provision of the recorder enables the automatic answering of an incoming call. This, as hereinbefore stated, is effected by the switch 30, the handle of which is an extension on the armature of the associated relay coil 292. Operation of the switch to its "on" position causes energization of the relay coil which locks the switch through its own contact 6, the locking circuit including conductor 248, coil 292, associated make contact and armature 6, conductor 298, conductor 244, break contact and armature 6 of relay WUR to conductor 240. After placing a sheet of recording paper or a ticket to be printed on the recorder, as the case may be, the switch 30 is moved to its "on" position above described. The switch may be restored to its "off" position manually if desired. Tongue 2 and make contact of switch 30 may be employed to place a ground on the "answer next" circuit 296 leading to the concentrator 218 to indicate that the recorder is available for an incoming call. Make contact and tongue 4 of switch 30 when actuated place a short across the start button 32, by means of conductors 298 and 300, so that when the incoming call operates either relay LR1 or LR2, relay STR will be energized (the buzzer does not sound) and the blank is wrapped and the sequence is started.

In the event that the apparatus should be started without a recording blank or ticket form in position for wrapping, the recorder will go through a wrapping cycle, and at the completion of the wrapping cycle the wrap switch 135 will be operated to its lower contact. Operation of this switch, through the closed contacts of the unoperated paper-in switch 142 will cause relay WUR to be energized over a circuit comprising conductor 288, paper-in switch, wrap switch 135, conductors 255 and 253, and make contact and armature 8 of energized relay STR to conductor 240, thus lighting the end-of-message light 25 and sounding the buzzer 28. The failure of the paper-in switch to operate prevented relay DLR from operating which, in turn, prevented phasing operations.

While there are shown and described herein certain specific constructions embodying the features of the invention as utilized in facsimile recording apparatus, it is to be understood that various of the features, particularly the wrapping, line feed, and scanning mechanisms, are applicable to facsimile transmitting apparatus of either the optical or electrical scanning type, and that various changes and modifications may be made without departing from the spirit of the invention which is not to be regarded as limited except as indicated by the scope of the appended claims.

What is claimed is:

1. A facsimile machine having a support for holding a sheet that is to be scanned by the machine, means for wrapping the sheet into cylindrical form for internal scanning, comprising a cylindrical former, a flexible wrapper web having the leading end thereof secured to said cylindrical former and having a following portion thereof for receiving the leading end of said sheet between the cylindrical former and the web, means for rotating said cylindrical former through a predetermined angle to wrap said sheet between said wrapper web and said former and hold the sheet in cylindrical form, a device having a scanning element for scanning the inner surface of the wrapped sheet, and a sheet-positioning member carried by said cylindrical former and against which the leading end of the sheet abuts when on said support and prior to a wrapping operation for phasing the sheet with said scanning element.

2. A facsimile machine according to claim 1, in which said sheet-positioning member is movably mounted, means for urging said member outwardly to cause it to project from the surface of said former a distance to engage the leading end of said sheet to be scanned, said member being constructed to move inwardly by the force exerted thereon by the trailing end of said sheet during a wrapping operation thereby to prevent deformation in the cylindrical form of the wrapped sheet.

3. A facsimile machine according to claim 2, in which the sheet-positioning member is mounted in a recess in the surface of the cylindrical former, and resilient means urges said member outwardly to cause it to project and engage the leading end of said sheet.

4. A facsimile machine according to claim 3, in which said wrapper web has an apertured portion in alignment with said sheet-positioning member whereby said member projects into the wrapper web to insure that the leading end of said sheet can not pass by said member.

5. A facsimile machine having means for wrapping a sheet into a cylindrical tube for internal scanning, comprising a cylindrical former and a wrapper member coacting therewith for receiving said sheet between them, means for actuating said former and wrapper member until said sheet is wrapped into a cylindrical tube with the leading and trailing ends of the wrapped sheet overlapping, means for so positioning said sheet laterally with respect to said cylindrical former and wrapper member prior to the wrapping operation as to cause a substantial length of a free end of the formed tube to extend beyond the cylindrical former and the wrapper member and unsupported except by the remainder of the tube held between the former and wrapper member, and a device having a scanning element for scanning the inner surface of the extending length of the tube.

6. A facsimile machine according to claim 5, in which the length of the cylindrical former and the width of the wrapper member each is less than the width of said sheet by an amount substantially corresponding to the extending length of the formed tube.

7. A facsimile machine having means for wrapping a sheet into a cylindrical tube for internal scanning, comprising a cylindrical former, a flexible wrapper web having the leading end thereof secured to said cylindrical former and having a following portion thereof for receiving the leading end of said sheet between the cylindrical former and the web, means for rotating said cylindrical former through a predetermined angle to wrap said sheet between said wrapper web and said former and hold the sheet in tubular form, means for so positioning said sheet laterally with respect to said web and former prior to the wrapping operation as to cause a substantial length of the formed tube to extend beyond the web and former and unsupported except by the remainder of the tube held between the web and former, and a device having a scanning element for scanning the inner surface of the extending length of the tube.

8. A facsimile machine according to claim 7, comprising means for rotating the cylindrical former through a first revolution thereof and a portion of a second revolution thereof to form a cylindrical tube with the leading and trailing ends of the wrapped sheet overlapping.

9. A facsimile machine having means for holding a sheet to be scanned, a scanning element and means for causing relative movement between the sheet-holding means and the scanning element for effecting scanning of the sheet, a scanning carriage movable along a longitudinal path for effecting line feed during a scanning operation, and drive means for said carriage comprising a traveling belt extending along said path and means for driving the belt at a predetermined speed, a magnetic armature rotatably mounted on said carriage, an idler member carried by the armature, said armature and idler member adapted to be rotated by said belt without causing movement of the carriage, and an electromagnet and magnetic structure operative when the electromagnet is energized to magnetically lock the armature and magnetic structure together for stopping the rotation of said idler member to thereby effect line feed movement of the scanning carriage, and spring-actuated means operative when said electromagnet is deenergized for causing the carriage automatically to return to its initial starting position, said armature and idler member idling backwards during the return movement of the carriage.

10. A facsimile recorder having means for wrapping a recording sheet into a cylindrical tube for internal scanning and for unwrapping the sheet at the end of a recording operation, comprising a rotatable electrical stylus for marking the inner surface of the tube in accordance with received facsimile signals, means including a drive shaft and a driven member for rotating said stylus to effect scanning, brake means for retarding rotation of said driven member, and stylus-positioning means including said driven member operative upon the application of said brake means for retracting said stylus out of contract with said inner surface of the tube both prior to and at the completion of a recording operation and for actuating the stylus into contact with said tube upon release of said brake means to effect a recording operation.

11. Apparatus according to claim 10, in which the stylus-positioning means includes a resilient member intercoupling the driven member and drive shaft and operative when the brake means is applied to permit continued rotation of the driven member through a limited angle to retract the stylus out of recording position, said resilient member acting to cause return of the stylus to its recording position upon release of said brake means.

12. A facsimile recorder having means for wrapping a recording sheet into a cylindrical tube for internal scanning and for unwrapping the sheet at the end of a recording operation, comprising a rotatable electrical stylus for marking the inner surface of the tube in accordance with received facsimile signals, a driven member on which the stylus is mounted, means including a drive member for rotating said driven member, brake means including brake shoes for engaging a rotatable member, a spring intercoupling said driven member and rotatable brake member in driving relation whereby upon application of the brake shoes to the rotatable brake member the spring is tensioned by the further rotation of said driven member through a predetermined angle relative to the brake member, said brake member having stop means and said driven member having means coacting therewith for stopping rotation of the driven member when it has rotated through said predetermined angle and including means for rotating said stylus out of contact with said inner surface of the tube and operative to cause the tensioned spring to rotate the stylus into contact with said tube upon release of said brake shoes to effect a recording operation.

13. A facsimile machine having scanning mechanism for wrapping a sheet into cylindrical form for internal scanning, comprising a cylindrical former, a flexible wrapper web having the leading end thereof fixedly attached to said cylindrical former and having a following portion thereof for receiving the leading end of said sheet between the cylindrical former and the web, driving means including an electric motor and means including switch members operative to cause the motor to rotate said cylindrical former in one direction and wrap the sheet between the cylindrical former and wrapper web until the trailing end of the formed sheet overlaps the leading end thereof, means including a stop member for preventing further rotation of the cylindrical former when said sheet has thus been wrapped in cylindrical form, a device having a scanning element for scanning the inner surface of the wrapped sheet, means including other switch members operative to cause said motor to rotate the cylindrical former in an opposite direction for unwrapping and ejecting said sheet when scanning thereof has been completed, and means including a stop member for preventing further rotation of the cylindrical former in said opposite direction when the unwrapping operation is completed.

14. A facsimile machine according to claim 13, including a fixed supporting member for holding and positioning a sheet to be wrapped, and fixed means extending upwardly from the supporting member and at a position to abut the trailing end of the sheet to flex a portion of the sheet upwardly and urge the leading end thereof into a position to be gripped between the cylindrical former and web at a place that phases the sheet with said scanning element.

References Cited in the file of this patent
UNITED STATES PATENTS

| | | |
|---|---|---|
| 762,623 | Eastwood | June 14, 1904 |
| 2,313,888 | Otis | Mar. 16, 1943 |
| 2,511,892 | Wise | June 20, 1950 |
| 2,581,616 | Young | Jan. 8, 1952 |
| 2,584,775 | Wise et al. | Feb. 5, 1952 |
| 2,585,519 | Grinten | Feb. 12, 1952 |
| 2,672,503 | Hallden et al. | Mar. 16, 1954 |
| 2,716,153 | Magnusson | Aug. 23, 1955 |